Jan. 8, 1952     R. C. OSGOOD     2,581,437
MATERIAL LOADING APPARATUS
Filed Dec. 22, 1945     3 Sheets-Sheet 1
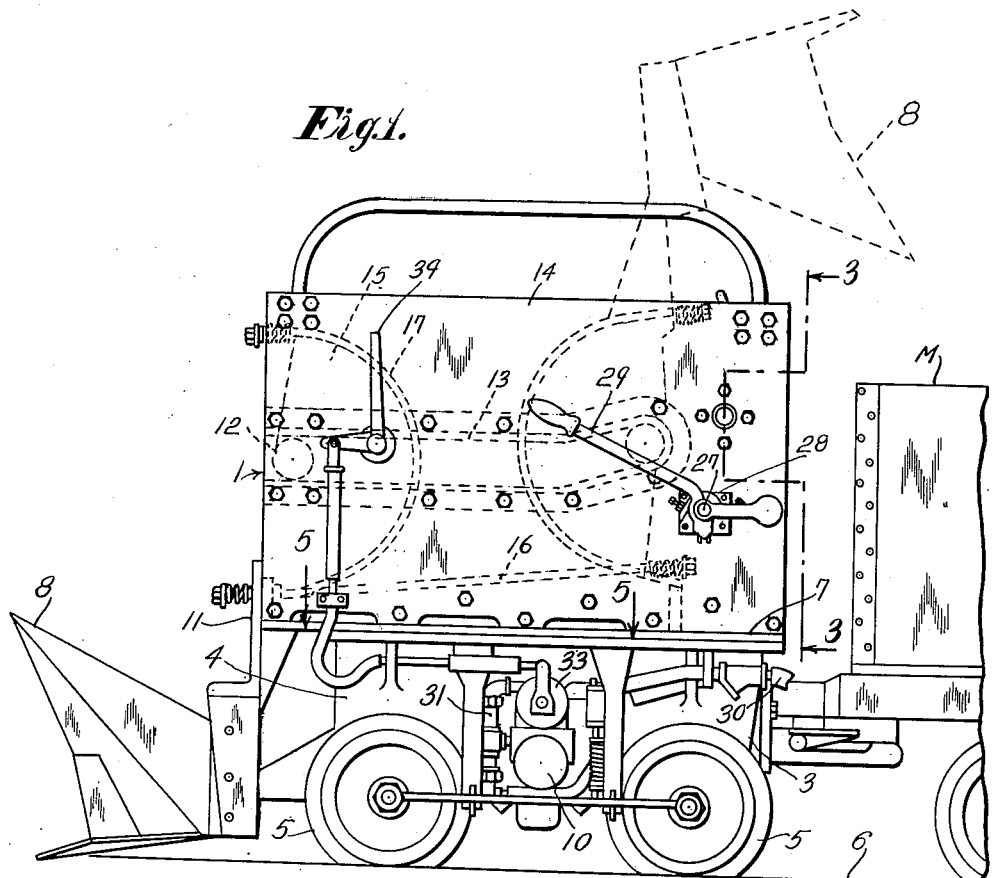
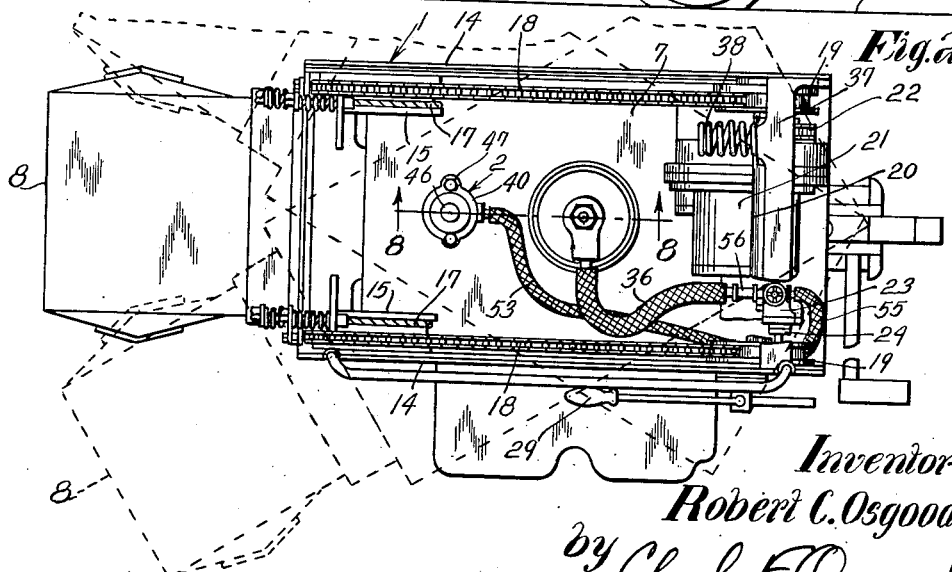
Inventor:
Robert C. Osgood.
by Charles F. Osgood,
Atty.

Jan. 8, 1952  R. C. OSGOOD  2,581,437
MATERIAL LOADING APPARATUS
Filed Dec. 22, 1945  3 Sheets-Sheet 2
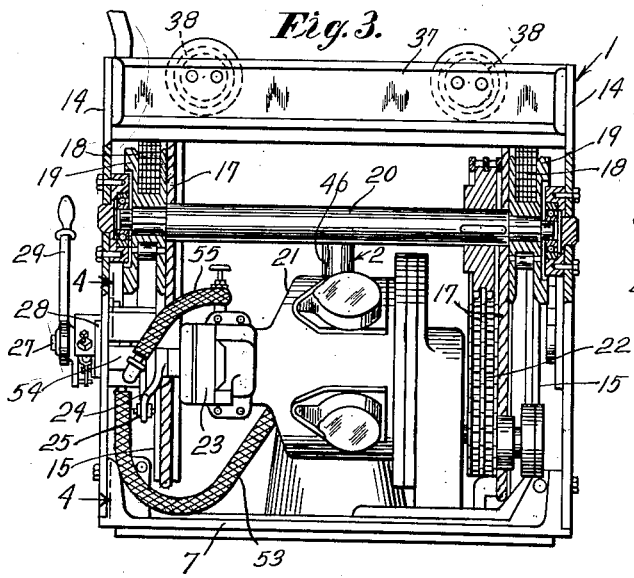
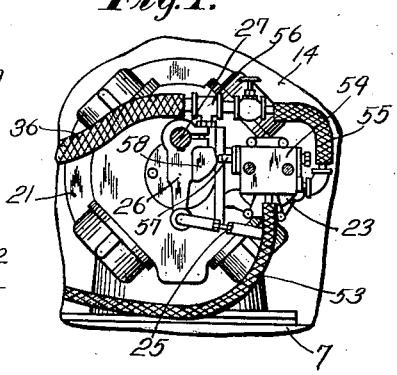
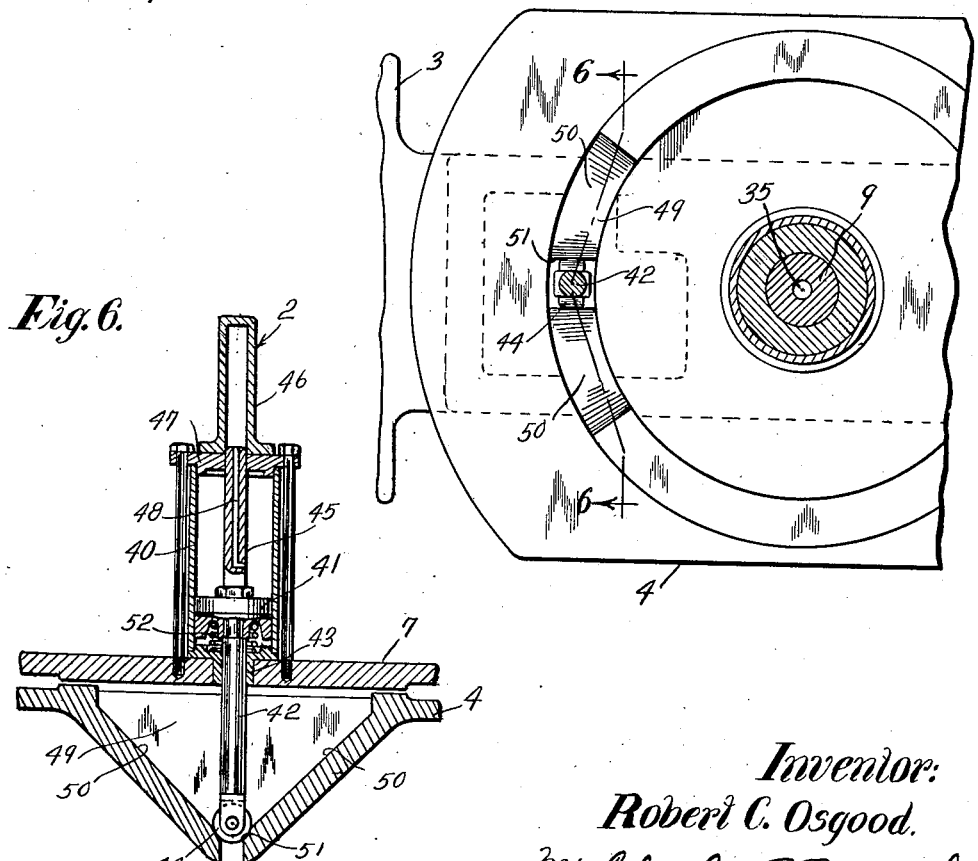
Inventor:
Robert C. Osgood.
by Charles F. Osgood,
Atty.

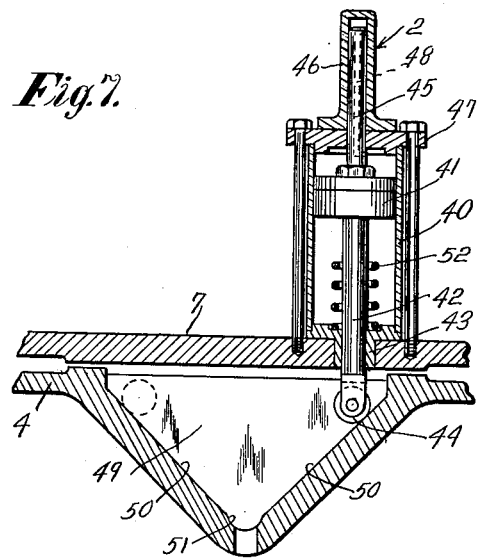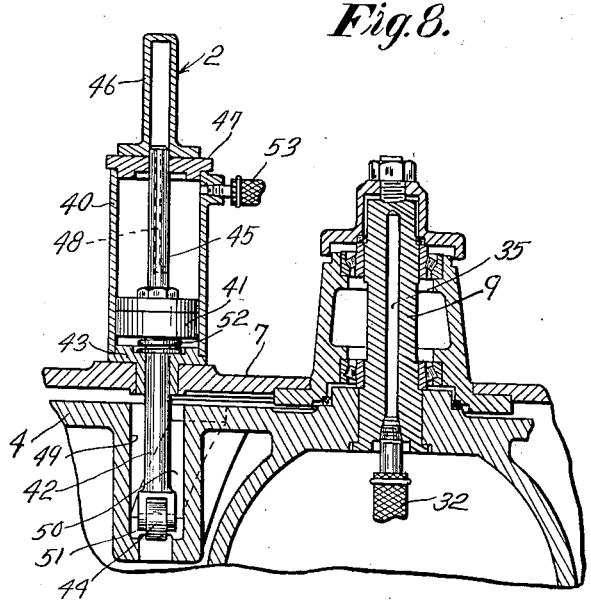

Patented Jan. 8, 1952

2,581,437

UNITED STATES PATENT OFFICE 2,581,437

MATERIAL LOADING APPARATUS

Robert C. Osgood, Claremont, N. H., assignor to Joy Manufacturing Company, a corporation of Pennsylvania Application December 22, 1945, Serial No. 636,811

7 Claims. (Cl. 214—132)

This invention relates to material loading apparatus and more particularly to an improved shovel loader having means for centering the shovel with respect to the loader base as the shovel swings upwardly from a laterally located digging position toward its raised dumping position.

In material loading apparatus of the kind known as a shovel loader, the shovel is usually mounted on a turntable on a portable base to swing laterally into digging position at either side of the base and the shovel is swingable in a vertical direction relative to the turntable between its lowered digging position and its raised dumping position. In such loading apparatus, the shovel is usually swung manually on its turntable mounting to locate the shovel in the desired digging position at the side of the base, and it is desirable that the shovel be brought into alinement wth the base by power as the shovel swings upwardly from its laterally located digging position so that discharge of the shovel contents into a mine car, located rearwardly of the loader, is assured. After discharge of the shovel contents is effected, the shovel may be quickly returned to its lowered digging position and the power operated centering means is rendered inactive as the shovel swings downwardly so that as the shovel descends, it may easily and quickly be manually turned laterally on its turntable mounting again into a laterally located digging position.

It is an object of the present invention to provide an improved material loading apparatus. Another object is to provide an improved power operated centering means for the shovel of a shovel loader so that the shovel may be brought into alinement with the loader base as it swings upwardly toward dumping position, thereby assuring discharge of the shovel contents at the proper location rearwardly of the loader base. A further object is to provide an improved shovel centering means which may be rendered effective as the shovel is raised from its digging position and which may be rendered inactive as the shovel is lowered from its raised dumping position. A still further object is to provide an improved power operated centering means for the shovel of a shovel loader comprising a cam and a cooperating roller which is movable by power relative to the cam by swinging the shovel from a laterally located digging position into alinement with the loader base. Yet another object is to provide an improved shovel centering means comprising a cam on the loader base and a cooperating roller movable relative to the cam by means of a fluid cylinder mounted on the turntable, for centering the shovel with respect to the loader base. A further object is to provide an improved power operated means for swinging the shovel of a shovel loader horizontally relative to the loader base and for holding the shovel in alinement with the loader base. These and other objects and advantages of the invention will, however, hereinafter more fully appear.

In the accompanying drawings there is shown for purposes of illustration one form which the invention may assume in practice.

In these drawings:

Fig. 1 is a side elevational view of a shovel loader in which an illustrative form of the invention is embodied, and showing a mine car coupled to the rear end of the loader.

Fig. 2 is a plan view of the shovel loader shown in Fig. 1.

Fig. 3 is an enlarged cross-sectional view taken substantially on lines 3—3 of Fig. 1.

Fig. 4 is a longitudinal vertical sectional view taken on line 4—4 of Fig. 3, illustrating a portion of the control means for the shovel raising motor and the centering cylinder.

Fig. 5 is an enlarged horizontal sectional view taken substantially on line 5—5 of Fig. 1.

Fig. 6 is a developed vertical sectional view taken substantially on lines 6—6 of Fig. 5, illustrating the improved centering means with the latter in centered position.

Fig. 7 is a view similar to Fig. 6, showing the centering means in a laterally located inactive position.

Fig. 8 is an enlarged longitudinal vertical sectional view taken substantially on line 8—8 of Fig. 2.

In this illustrative embodiment of the invention there is shown a material loading apparatus of the shovel loader type, generally designated 1, in which the improved power operated shovel centering means, generally designated 2, is embodied. The shovel loader may be of the same general character as that disclosed in my Patent No. 2,268,570, dated January 6, 1942, and comprises a portable base 3 having a base frame 4 mounted on wheels 5 adapted to travel along a trackway 6. Swivelled on the base is a turntable 7 on which a vertically swingable shovel or bucket 8 is mounted. The base frame 4 has fixed thereto a vertical shaft 9 supporting bearings on which the turntable is journaled, and the turntable may be turned on its bearing mounting into positions to locate the shovel laterally at either side of the base, as indicated in dotted lines in Fig. 2, so that the shovel may dig into the material to be loaded at either side of the trackway. As disclosed in the patent above referred to, a conventional reversible fluid motor 10 on the base frame 4 beneath the turntable is operatively connected to the wheels 5 for propelling the loader back and forth along the trackway, and the traction of the wheels is utilized to effect digging of the shovel forwardly into the material to be loaded. Coupled to the rear end of the loader base is a mine car M, having its wheels guided on the trackway.

As is also fully described in the above mentioned patent, the shovel or bucket 8 is supported by arms 11, which carry rolls 12 guided in substantially horizontally guideways 13 on the inner sides of the vertical side plates 14 on the turntable. Thus the rollers provide a rolling pivotal support for the shovel and the shovel supporting arms are swingably supported to turn on axes coincident with the roll support axes as the shovel is swung about its fulcrum point, and as the shovel is swung upwardly from its digging position, the rollers move rearwardly along the guideways 13 and the guideways serve to confine the shovel as it swings upwardly to movement in a predetermined curved path. Secured to the arms are segments 15 of semi-circular shape (see Fig. 1) having cable guiding grooves for receiving pairs of flexible spring-tensioned cables 16, 16 and 17, 17, each of which is secured at one end to the shovel arms and at its other end to the turntable. These pairs of cables serve to compel swinging movement of the arms thereby to effect movement of the shovel side arms bodily longitudinally as they are swung, and to provide, in effect, a moving fulcrum point for the shovel; and they serve to effect movement of the shovel through a wide arc as it moves between its lowered digging position and its raised dumping position. The arm segments, roller mounting and cable connections are fully described in the patent above referred to.

For raising and lowering the shovel on its roller mounting, there are, in this instance, provided side chains 18 fastened to the shovel arms and wound on drums 19 (Fig. 3) fixed to a transverse shaft 20 suitably journaled in bearings supported by the vertical side plates 14. A conventional reversible fluid motor 21 is mounted on the turntable and has its power shaft connected through a chain and sprocket drive 22 to the drum shaft 20. The motor has a conventional rotary reversing valve 23 operated by a lever arm 24 connected by a link 25 to a lever arm 26 keyed to a horizontal shaft 27. The shaft 27, as shown in Fig. 3, is journaled in a bracket 28 fixed to the outer side of the adjacent side plate 14 and has secured thereto at its outer end an operating lever 29.

Pressure fluid may be supplied to the motors 10 and 21 through a supply hose 30 (Fig. 1) on the base connected to branched pipe connections 31 and 32 arranged on the base frame beneath the turntable. The pipe connection 31 is connected to a reversing valve 33 for the propelling motor 10, and the valve 33 is controlled through suitable connections having an operating lever 34 mounted on one of the side plates 14. The pipe connection 32 is connected to the lower end of an axial passage 35 in the stationary vertical shaft 9 (Fig. 8) and the upper end of the passage 35 is connected by a flexible hose 36 to the fluid supply for the shovel raising motor 21. Pressure fluid may flow to the power operated centering mechanism 2 for the shovel also under the control of the operating lever 29 for the motor reversing valve in a manner fully described in copending application, Serial No. 626,954, filed November 6, 1945, in which I am one of the co-inventors. Carried by a cross plate 37 which braces the vertical side plates 14, are spring buffers 38, 38 engageable by the shovel supporting arms to provide a cushioned stop for the shovel when the latter assumes its raised dumping position as indicated in dotted lines in Fig. 1. When the rearward movement of the shovel is abruptly stopped by the buffer springs, the shovel contents are discharged into the mine car M. The buffer springs also initiate forward movement of the shovel from its dumping position and when the center of gravity is passed, the shovel may drop down under its own weight. To speed up the return of the shovel, the shovel raising motor 21 may be reversed to rotate the cable drums 19 in unwinding direction to slacken the side chains 18 so that the shovel may freely drop down into its digging position.

The power operated centering mechanism 2 serves to aline the shovel with respect to the loader base as the shovel moves upwardly from a laterally located digging position so that discharge of the shovel contents into the mine car M is assured. This centering mechanism comprises a single acting fluid cylinder 40 arranged vertically on the turntable 7 midway between the sides thereof, and preferably in advance of the turntable swivel, and this cylinder contains a reciprocable piston 41 having a piston rod 42 extending downwardly through a lower head 43 of the cylinder and carrying at its lower end a roller 44. Secured to the piston 41 and extending upwardly therefrom is a guide rod 45 movable in a vertical guide cylinder 46 secured to a top head 47 for the cylinder 40. Formed in this guide rod, as shown in Fig. 6, is a passage 48 for connecting the upper end of the cylinder to the bore of the guide cylinder 46 above the guide rod 45. The frame 4 of the loader base is formed with a recess 49 having relatively inclined, downwardly converging bottom walls 50, 50 extending at their opposite edges arcuately on radii struck from the center of the turntable swivel and arranged symmetrically at opposite sides of the central longitudinal vertical plane of the base, as shown in Fig. 5. These relatively inclined surfaces 50, 50 form a relatively stationary cam with which the roller engages and as the roller is moved downwardly, the turntable on which the shovel is mounted is swung horizontally into alinement with the base as will later be described. Formed at the intersection of the relatively inclined converging surfaces 50, 50 is a notch 51 which receives the roller 44 when the shovel is alined with the base for holding the shovel in its centered position. Arranged in the cylinder 40 and surrounding the piston rod 42 beneath the piston is a coil spring 52 for urging the piston 41 in an upward direction to release the roller 44 from the notch 51 when the fluid is vented from the cylinder. Pressure fluid may be supplied to the centering cylinder 40 at the upper side of the piston 41 through a hose 53 connected to an auxiliary control valve device 54 secured to the inner side of the adjacent vertical side plate 14. Also connected to this control valve device is a supply hose 55 connected to a T 56 to which the supply hose 36 is connected. As fully described in application, Serial No. 626,954, mentioned above, the valve device 54 contains a control valve having a stem 57 (Fig. 4) actuated by a cam 58 secured to the lever 26. When the operating lever 29 for the reversing valve 23 is swung rearwardly to the right in Fig. 1, the reversing valve is positioned to supply pressure fluid from the supply hose 36 to the shovel raising motor 21 to effect running of the latter in a direction to wind in the side chains 18 to raise the shovel from its digging position shown in full lines in Fig. 1. As the lever 29 is swung rearwardly, the cam 58 on the lever 26 moves the stem 57 of the valve of the auxiliary control valve device to move the valve into a position to supply pressure fluid from the hose 55 to the hose 53 leading to the upper end of the centering cylinder 40, so that when the shovel is in a laterally located position as indicated in dotted lines in Fig. 2, it will be brought into alinement with the base as the shovel moves upwardly toward its raised dumping position by the roller 44 moving along a cam surface 50 turning the turntable horizontally about its swivel. When the shovel is in centered position, it is held there by the roller engaging the notch 51. When the shovel reaches its raised dumping position and has been abruptly stopped by the buffer springs, the shovel contents are discharged into the mine car M and the springs bounce the shovel forwardly past its center of gravity so that it may drop back into its lowered digging position. As the shovel moves forwardly and downwardly, the operator may swing the lever 29 to the left in Fig. 1 to position the reversing valve 23 to reverse the shovel raising motor 21 to cause the drums 19 to unwind the side chains 18 to permit the shovel quickly to drop down into its digging position. When the shovel raising motor 21 is reversed, the cam 58 on the lever 26 is positioned to cause movement of the valve of the control valve device 54 to a position wherein it cuts off the fluid supply from the pipe 55 and connects the pipe 53 to exhaust, thereby exhausting the fluid from the centering cylinder 40, and as the shovel descends, the turntable may be freely and quickly turned manually with respect to the base again to locate the shovel in a lateral digging position at the side of the trackway. As is also fully described in the application, Serial No. 626,954 above referred to, when the lever 29 is in its neutral position, the reversing valve 23 is positioned to cut off fluid supply to the shovel raising motor 21 and the auxiliary valve device 54 is positioned to connect the centering cylinder 40 to exhaust. When the centering cylinder 40 is connected to exhaust, the coil spring 52 moves the roller 44 upwardly from the holding notch 51 and as the operator manually turns the turntable to locate the shovel in a lateral position at one side of the base, the roller moves upwardly along the inclined cam surfaces 50 with which it is engaged to the position shown in full lines in Fig. 7. When pressure fluid is supplied through the hose 53 to the upper end of the centering cylinder 40, the piston 41 is moved downwardly, moving the roller 44 along the relatively stationary cam surface 50 with which the roller engages to swing with a lateral camming action the turntable and shovel horizontally into alinement with the base and when the roller 44 enters the bottom notch 51, it serves to hold the shovel in its centered position. As pressure fluid flows to the upper end of the cylinder 40, it, at the same time, flows through the passage 48 to the bore of the guide cylinder above the guide rod 45 so that the entire cross-sectional area of the piston 41 is effective to force the roller downwardly. Instead of employing the auxiliary control valve 54 operated by the lever 29 of the reversing valve, it will be evident that the flow of pressure fluid to and the venting of fluid from the centering cylinder may be controlled by an independently controlled member in the manner fully described in my Patents No. 2,201,671, patented May 21, 1940, and No. 2,365,773, patented December 26, 1944. As the general mode of operation of a shovel loader of the type disclosed is well known to those skilled in the art and is fully described in the patents and application above referred to, further description thereof herein is unnecessary. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a material loading apparatus, the combination comprising a base element, a frame element mounted on said base element to swing horizontally with respect thereto, a shovel mounted on said frame element to swing horizontally therewith into a lateral digging position at one side of said base element and to move upwardly with respect to said frame element during the loading operation, power operated means for horizontally swinging said frame element from a lateral position into alignment with said base element, including a cam of substantial lateral extent on one element, a cam-engaging-member guided for rectilinear movement on said other element and engaging said cam in all lateral positions of said shovel relative to said base element and a power device for moving said member to cause the latter to travel along the surface of said cam, means to move said shovel upward, and control devices for effecting operation of said last mentioned means and said power device to effect movement of said frame element into its aligned position before said shovel reaches it raised discharging position.

2. In a material loading apparatus, the combination comprising a base element, a frame element mounted on said base element to swing horizontally with respect thereto, a shovel mounted on said frame element to swing horizontally therewith into a lateral digging position at either side of said base element and to move upwardly with respect to said frame element during the loading operation, power operated means for horizontally swinging said frame element from a lateral position into alignment with said base element including a cam having relatively inclined cam surfaces of substantial lateral extent converging toward the longitudinal center of one of said elements, a roller guided for rectilinear movement on said other element centrally between the sides of the latter and engageable with one or the other of said cam surfaces in all lateral positions of said shovel depending upon the direction in which said frame element is swung and a power device for moving said roller along a surface of said cam, means to move said shovel upward, and control devices for effecting operation of said last mentioned means and said power device to effect movement of said frame element into its aligned position before said shovel reaches its raised discharging position.

3. In a material loading apparatus, the combination comprising a base element, a frame element mounted on said base element to swing horizontally with respect thereto, a shovel mounted on said frame element to swing horizontally therewith into a lateral digging position at either side of said base element and to move upwardly with respect to said frame element during the loading operation, power operated means for horizontally swinging said frame element from a lateral position into alignment with said base element including a cam having relatively inclined cam surfaces converging toward the longitudinal center of one of said elements, said cam surfaces converging toward a central notch, a roller guided for rectilinear movement on said other element and engageable with one or the other of said cam surfaces depending upon the direction in which said frame element is swung, said roller being received in said notch when said frame element is aligned with said base element and serving to lock said frame element in its aligned position and a power device for moving said roller along a surface of said cam, means to move said shovel upward, and control devices for effecting operation of said last mentioned means and said power device to effect movement of said frame element into its aligned position before said shovel reaches its raised discharging position.

4. In a material loading apparatus, the combination comprising a base element, a frame element swivelly mounted on said base element to swing horizontally with respect thereto, a shovel mounted on said frame element to swing horizontally therewith to a lateral digging position at either side of said base element and to move upwardly with respect to said frame element during the loading operation, power operated means for horizontally swinging said frame element from a lateral position into alignment with said base element including a cam on one of said elements, said cam having upwardly facing, relatively inclined, converging cam surfaces of substantial lateral extent and arranged with their opposite edges struck on radii extending from the swivel axis of said swinging frame element, a roller guided on said other element for movement along a vertical rectilinear path and adapted to travel downwardly along one or the other of said cam surfaces irrespective of the lateral position of said shovel depending upon the direction in which said frame element is swung and a power device on said other element for moving said roller along its path, means to move said shovel upward, and control devices for effecting operation of said last mentioned means and said power device to effect movement of said frame element into its aligned position before said shovel reaches its raised discharging position.

5. In a material loading apparatus, the combination comprising a base, a frame swivelly mounted on said base to swing horizontally with respect thereto, a shovel mounted on said frame to swing horizontally therewith into a lateral digging position at either side of said base and to move upwardly with respect to said frame during the loading operation, power operated means for horizontally swinging said frame from a lateral position into alignment with said base including a cam of substantial lateral extent on said base, said cam having downwardly converging cam surfaces extending from relatively high points at the sides of said base toward a relatively low point at the center of said base, a roller guided for vertical rectilinear movement on said frame along a path located at a point spaced radially from the frame swivel, said roller engageable with one or the other of said cam surfaces irrespective of the lateral position of said shovel depending upon the direction in which said frame is swung and a vertical power device on said frame for moving said roller downwardly along its path, means to move said shovel upward, and control devices for effecting operation of said last mentioned means and said power device to effect movement of said frame into its aligned position before said shovel reaches its raised discharging position.

6. In a material loading apparatus, the combination comprising a base, a frame mounted on said base to swing horizontally with respect thereto, a shovel mounted on said frame to swing horizontally therewith into a lateral digging position at either side of said base and to move upwardly with respect to said frame during the loading operation, power operated means for horizontally swinging said frame from a lateral position into alignment with said base including a cam on said base, said cam having downwardly converging cam surfaces, said cam surfaces converging toward a central notch located midway between the sides of said base, a roller guided for vertical rectilinear movement on said frame and engageable with one or the other of said cam surfaces depending upon the direction in which said frame is swung and a vertical power device on said frame for moving said roller along its path, said roller being received in said notch when said frame is aligned with said base to lock said frame in its aligned position, means to move said shovel upward, and control devices for effecting operation of said last mentioned means and said power device to effect movement of said frame into its aligned position before said shovel reaches its raised discharging position.

7. In a material loading apparatus, the combination comprising a portable base, a frame swiveled on said base to swing horizontally with respect thereto, a shovel supported on said frame for movement relative thereto from its material receiving position to its material discharging position, said frame swingable horizontally relative to said base to position said shovel in a lateral digging position at either side of the path of movement of said base, and power operated self-centering means for said shovel for horizontally swinging said frame, upon continued supply of motive power thereto, into alignment with said base during the loading movement of said shovel relative to said frame, said self-centering means including a cam of substantial lateral extent on and stationary relative to said base, said cam having relatively inclined cam surfaces extending toward the sides of said base and converging inwardly toward the longitudinal center of said base, a roller guided for rectilinear movement on said swiveled frame and engageable with one or the other of said cam surfaces in all lateral positions of said shovel depending upon the direction in which said frame is swung and a power device on said swiveled frame for moving said roller, said roller when said frame is in its aligned position being located near the point of intersection of lines in which said cam surfaces lie to lock said frame against further swinging movement, the roller axis located at the longitudinal center of said aligned base and frame when said roller is in said locking position.

ROBERT C. OSGOOD.

REFERENCES CITED

The following references are of record in the file of this patent:

UNITED STATES PATENTS

| Number | Name | Date |
|---|---|---|
| 1,418,693 | Bauer | June 6, 1922 |
| 2,077,159 | Stoltz | Apr. 13, 1937 |
| 2,134,582 | Royle | Oct. 25, 1938 |
| 2,170,240 | Fitch | Aug. 22, 1939 |
| 2,201,671 | Osgood | May 21, 1940 |
| 2,268,570 | Osgood | Jan. 6, 1942 |
| 2,282,613 | Sheets | May 12, 1942 |
| 2,342,770 | Temple | Feb. 29, 1944 |
| 2,407,088 | Maxson | Sept. 3, 1946 |